Oct. 28, 1941.  W. H. FURNESS  2,260,565
HELICAL WINDER
Filed May 25, 1940   6 Sheets-Sheet 1

INVENTOR.
William Henry Furness
BY
Synnestvedt & Lechner
ATTORNEYS

Oct. 28, 1941.  W. H. FURNESS  2,260,565
HELICAL WINDER
Filed May 25, 1940  6 Sheets-Sheet 2

INVENTOR:
William Henry Furness
BY Lynnestvedt + Lechner
ATTORNEYS.

Oct. 28, 1941. W. H. FURNESS 2,260,565
HELICAL WINDER
Filed May 25, 1940 6 Sheets-Sheet 3

Fig. 3.

INVENTOR.
William Henry Furness
BY
Synnestvedt & Lechner
ATTORNEYS

Oct. 28, 1941.   W. H. FURNESS   2,260,565
HELICAL WINDER
Filed May 25, 1940   6 Sheets-Sheet 4

INVENTOR.
William Henry Furness
BY
Lynnestvedt + Lechner
ATTORNEYS.

Oct. 28, 1941.　　　W. H. FURNESS　　　2,260,565
HELICAL WINDER
Filed May 25, 1940　　　6 Sheets-Sheet 5

INVENTOR.
William Henry Furness
BY
Synnestvedt & Lechner
ATTORNEYS.

Oct. 28, 1941.   W. H. FURNESS   2,260,565
HELICAL WINDER
Filed May 25, 1940   6 Sheets-Sheet 6

INVENTOR.
William Harry Furness

ATTORNEYS.

Patented Oct. 28, 1941

2,260,565

UNITED STATES PATENT OFFICE 2,260,565

HELICAL WINDER

William H. Furness, Haddonfield, N. J., assignor to American Rayon Company, Inc., Riverton, N. J., a corporation of New Jersey Application May 25, 1940, Serial No. 337,121

16 Claims. (Cl. 242—53)

This invention relates to a simple and effective method and apparatus for laying up thread, such as freshly spun rayon filaments, cotton yarns, and the like, for treatment.

The nature, objects and advantages of my invention will appear from the following description, taken in connection with the accompanying drawings, in which—

The apparatus comprises in general a cage-like cylinder A having a multiplicity of longitudinally extending rods or wires arranged in circumferentially spaced circular formation, a whorl B for laying thread onto said cylinder adjacent one end thereof, a whorl C for taking thread off said cylinder adjacent the other end, cam means D for moving said rods in directions to advance the thread along the cylinder from the receiving end to the taking off end in the form of a continuously advancing helix, drive means E and F for the whorls B and C, and gear means G associated with the cylinder for a purpose hereinafter appearing.

Figure 4:
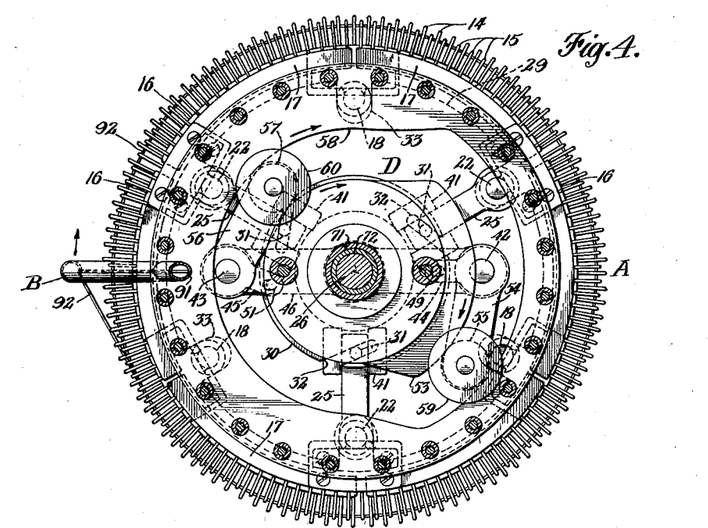
Figure 4 is a cross-section taken substantially on the line 4—4 of Figure 2.
Figure 5:
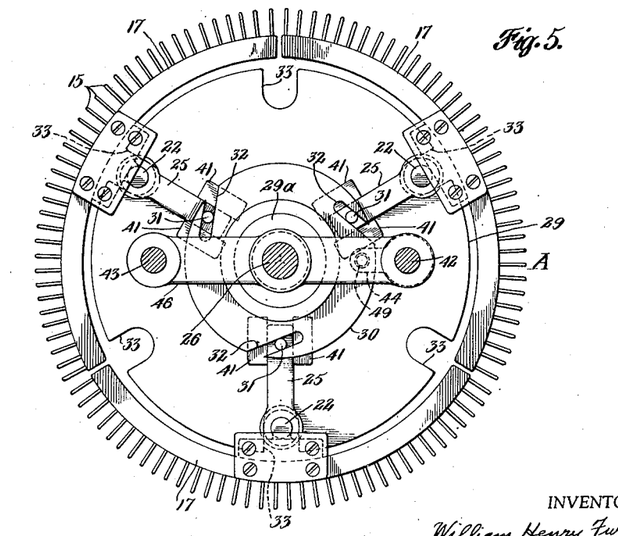
Figure 5 is a cross-section taken substantially on the line 5—5 of Figure 2.
Figure 6:
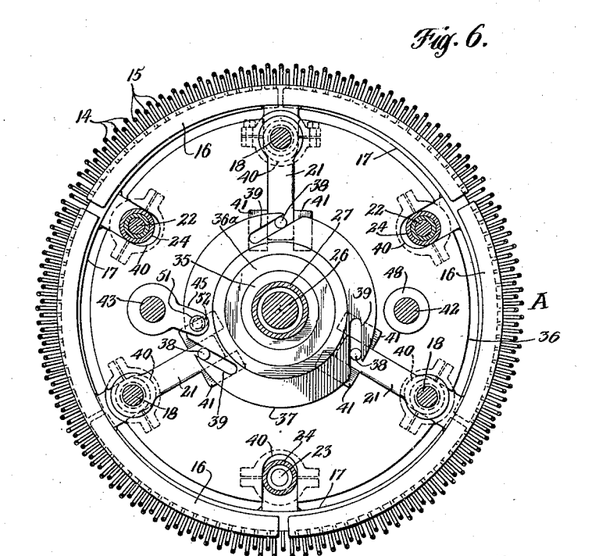
Figure 6 is a cross-section taken substantially on the line 6—6 of Figure 2.
Figure 7:
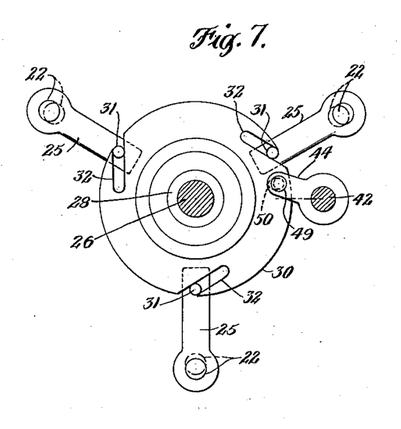
Figure 7 is a more or less diagrammatic cross-section similar to Figure 4 but only showing certain actuating parts.
Figure 8:
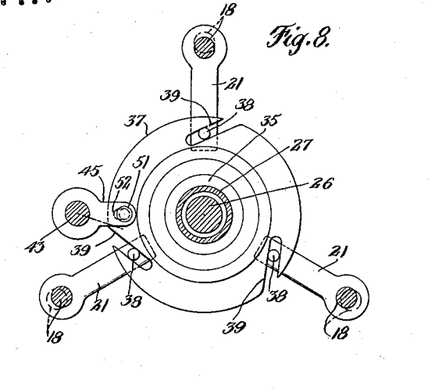
Figure 8 is a more or less diagrammatic cross-section similar to Figure 6 but only showing certain actuating parts.
Figure 9:
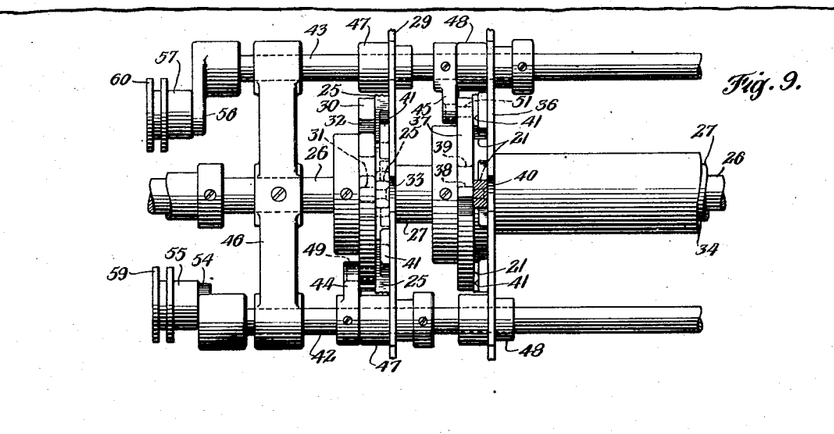
Figure 9 is a fragmentary plan view of certain of the parts which are located at the left-hand end portion of the cage-like cylinder of the apparatus.

The rods of the cylinder A are arranged in two sets 14 and 15 with the rods of one set in spaced interspersed relation with those of the other set, as will be seen from inspection of Figures 4 and 6. The rods of each set are divided into a plurality of groups, in this instance three, as by means of arcuate supporting members 16 and 17. A plurality of sets of these arcuate supporting members are employed along the length of the cylinder and in this instance I have shown a set at each end of the cylinder and an intermediate set.

Figure 2:
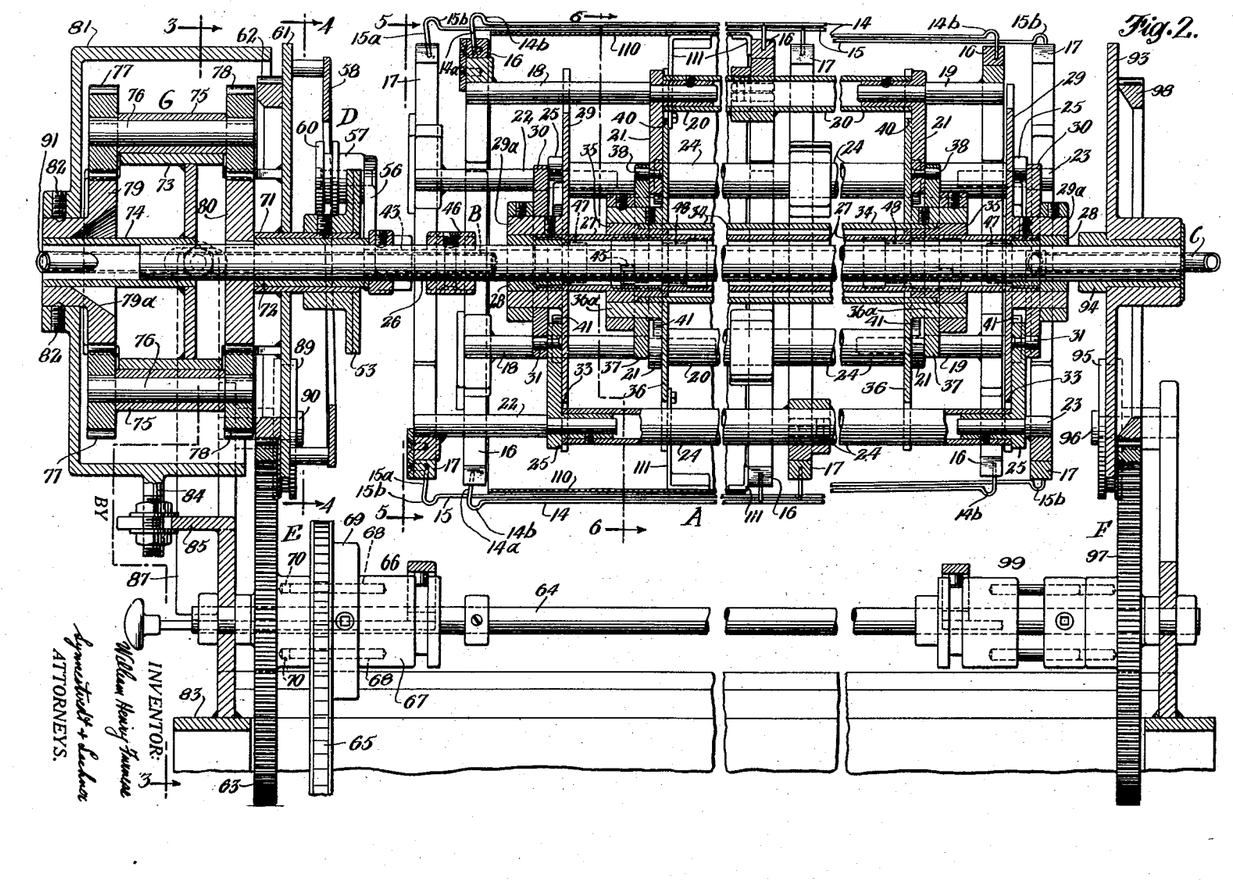
Figure 2 is an enlarged longitudinal sectional view of the apparatus with portions of the cylinder broken out and with certain parts appearing in elevation.

The rods 14 are secured in circumferentially spaced holes in the arcuate members 16 and the rods 15 in circumferentially spaced holes in the arcuate members 17. The rods are preferably made of small gauge wire, and it is to be noted that the left-hand inturned ends 14a and 15a of the rods are inclined to fit into inclined holes in the arcuate members as shown in Fig. 2. The rods are put under tension when securing them into these holes and this tension may be adjusted by means of the curved portions 14b and 15b at the ends of the rods as by pinching them with pliers to stretch the wire. Slight adjustment of the position of the rods may also be made by means of these curved portions.

The arcuate members 16 of each group of the set of rods 14 are tied together by means of longitudinally extending bars composed of end rods 18 and 19 and a tubular rod 20 to which inwardly extending radial arms 21, 21 are secured. Similarly the arcuate members 17 of each group of the set of rods 15 are tied together by means of longitudinally extending bars composed of end rods 22 and 23 and a tubular rod 24 to which inwardly extending radial arms 25, 25 are secured.

A longitudinally extending shaft 26 is mounted coaxially with the cylinder A and projects from the ends of the cylinder. The manner of supporting this shaft will appear hereinafter. A sleeve 27 is rotatably mounted on the shaft 26 by means of end bearings 28, 28, and a pair of disc-like members 29, 29 are secured to the sleeve, one at each end of the sleeve. A peripherally slotted plate 30 is rotatably mounted on the hub 29a of each of said disc-like members in axial spaced relation to the disc portions of the members. The radial arms 25 above referred to, extend into the spaces between the discs and the slotted plates, and are provided with pins 31 which operate in the inclined peripheral slots 32 of the plates 30. The disc-like members 29 are provided with circumferentially spaced radial slots 33 at their peripheries for receiving the longitudinal tie bars of the arcuate members, it being pointed out that the tubular rods 24 are guided in the alternate radial slots for radial in and out movement when the plates 30 are oscillated to move the three groups of rods 15 in and out.

Similarly a sleeve 34 is rotatably mounted on the sleeve 27 by means of end bearings 35, 35 and a pair of disc-like members 36, 36 are secured to the sleeve, one at each end thereof. A peripherally slotted plate 37 is rotatably mounted on the hub 36a of each of said dics-like members in axial spaced relation to the disc portions of the members. The radial arms 21 above referred to, extend into the spaces between the discs and the slotted plates, and are provided with pins 38 which operate in the inclined peripheral slots 39 of the plates 37. The disc-like members 36 are provided with circumferentially spaced slots 40 at their peripheries for receiving the longitudinal tie bars of the arcuate members, it being pointed out that the tubular rods 20 are guided in the alternate radial slots for radial in and out movement when the plates 37 are oscillated to move the three groups of rods 14 in and out. The arms 21 and 25 are guided in their radial in and out movement by guides 41 carried by the discs 29 and 36.

The plates 30 and the plates 37 are oscillated by means of longitudinally extending cam operated rock shafts 42 and 43, the rock shaft 42 having operative connection with the plates 30 by means of arms 44 secured thereon, and the rock shaft 43 having operative connection with the plates 37 by means of arms 45 secured thereon. The rock shafts 42 and 43 are mounted, adjacent one end thereof, in a cross arm 46 secured to the central shaft 26, with freedom for rocking and axial movement. These rock shafts are additionally supported in bushings 47 and 48 carried by the disc members 29 and 36 respectively. The arms 44 are provided with pins 49 operating in radial slots 50 in the plates 30, and the arms 45 are provided with pins 51 operating in radial slots 52 in the plates 37. Thus, when rocking motion is imparted to the rock shafts the plates 30 and 37 will be oscillated accordingly.

Rocking motion is imparted to the rock shafts by means of a rotating cam 53 it being noted that the rock shaft 42 is provided with an arm 54 carrying a cam roller 55 riding on the cam surface of the cam 53 and that the rock shaft 43 is provided with an arm 56 carrying a cam roller 57 also riding on the cam surface of the cam 53.

In addition back and forth movement longitudinally of the cylinder is imparted to these rock shafts by means of a rotating cam 58 and cam rollers 59 and 60 carried by the arms 54 and 56 respectively of the rock shafts.

The cams 53 and 58 are secured to a circular disc 61 to which is also secured a driven gear 62 meshing with a driving gear 63 rotatably mounted on a drive shaft 64 of the drive means E and F. The drive shaft 64 is rotated as by means of a chain drive 65 connected to a suitable prime mover. A clutch device 66 is provided for connecting and disconnecting the gear 63 with the drive shaft. The clutch device comprises a shiftable collar 67 having a plurality of pins 68 passing through holes in the sprocket 69, which is secured to the drive shaft, and shiftable into and out of engagement with the holes 70 in the hub of the driving gear 63.

The disc 61 is provided with a central hub 71 and is rotatably mounted on the shaft 26 by means of a bearing sleeve 72. A cylindrical member 73 is secured to the disc 61 concentrically therewith and is provided with a central sleeve 74 into which the end of the shaft 26 extends. The disc 61 is also provided with a pair of diametrically opposed bearings 75, 75 in which shafts 76, 76 are rotatably mounted.

Gears 77 and 78 are keyed to the shafts 76 at their ends. The gears 77 mesh with a gear 79 mounted on the sleeve 74 and the gears 78 mesh with a gear 80 keyed on the shaft 26. The gear 79 is secured to a fixed casing 81 as by means of set screws 82, the casing being secured to the fixed framework 83 of the apparatus by means of a lower stud 84 secured to a bracket 85 of the framework and by means of set screws 86 carried by arms 87 secured to the framework.

The circular disc 61 above referred to is supported peripherally thereof by means of a pair of circumferentially spaced guide rollers 89 rotatably mounted on studs 90 secured to the framework of the machine.

The thread laying up whorl B is in the form of a tube 91 which extends at an angle (see Figure 1) from a point adjacent the axis of the sleeve 74 to a point adjacent the periphery of the cage-like cylinder A at the receiving end thereof. This tube passes through the sleeve 74, the cylindrical member 73, the disc 61, and the cam 58 and is secured in place to rotate with these members, it being noted that the stationary gear 79 has a conical recess 79a to provide clearance for the rotating tube. The thread 92 leading from a suitable source is passed through the tube 91 and laid on the cylinder, it being pointed out that when thread is laid onto the cylinder in initially starting the apparatus it is wrapped around the cylinder one or two turns so as to start it in helical movement along the cylinder.

A circular disc 93 similar to the disc 61 is rotatably mounted on the shaft 26 at the thread take-off end of the cylinder by means of a bearing sleeve 94, and is peripherally supported by means of a pair of circumferentially spaced guide rollers 95 rotatably mounted on studs 96 secured to the framework of the machine. The thread take-off whorl C, also of tubular form, is secured to the disc 93 and extends at an angle (see Figure 1) from a point adjacent the axis of the cylinder A to a point adjacent the periphery thereof at its thread take-off end. The thread is led from the end of the cylinder through the tubular whorl C and from there to a suitable form of winding device.

The disc 93 and the whorl C are rotated by the drive means F comprising a driving gear 97 rotatably mounted on the drive shaft 64, a driven gear 98 secured to the disc 93 concentrically therewith, and a clutch device 99 similar to the clutch device of the drive means E for drivingly connecting and disconnecting the gear 98 with the drive shaft 64.

Reverting now to the gear means G, it will be seen that since the gear 79 is held stationary and the bearings 75 for the gears 77 and 78 are rotated around the axis of the shaft 26 by means of the gears 62, 63, the gears 77 and 78 are carried around the gears 79 and 80 with which they mesh as planetary gears. However, since the gears 79 and 80 are of the same diameter, as are also the gears 77 and 78, the gear 80 remains stationary with its stationary coaxial gear 79. Thus, the cage-like cylinder A is held against rotation because of the gear 80 and the cross arm 46 being secured to the shaft 26.

However, the thread laying up whorl B and the cams 53 and 58 rotate, thus causing the thread to be laid onto the cylinder by being whirled therearound. As the thread is so laid it is also advanced along the cylinder in the form of a continuously advancing helix by the movement imparted to the sets of rods 14 and 15 by the cams, as will now appear.

The cam 53 and its associated cam rollers 55 and 57 and arms 54 and 56 impart rocking motion to the rock shafts 42 and 43, which, in turn, impart in and out movement to the sets of rods 14 and 15, through the medium of the arms 44 and 45, the plates 30 and 37, the arms 21 and 25 and the longitudinally extending tie rods of the arcuate members 16 and 17. With the cams in the positions shown in the drawings and rotating in the direction of the arrows shown in Figure 4 the rods of the set 14 are being held in their outermost positions and the rods of the set 15 in their innermost positions by the cam 53, it being noted that the cam roller 55 which effects actuation of the set of rods 15 is riding on the high dwell of the cam 53 and that the cam roller 57 which effects actuation of the set of rods 14 is riding on the low dwell of the cam. As the cam rotates the roller 55 will ride onto the low dwell of the cam to move the rods of the set 15 to their outermost positions and the roller 57 will ride onto the high dwell of the cam to move the rods of the set 14 to their innermost positions. Thus, continued rotation of the cam 53 imparts continued in and out motion to the sets of rods.

At the same time that the above is taking place the cam 58 and its associated cam rollers 59 and 60 and the arms 54 and 56 impart longitudinal back and forth motion to the rock shafts 42 and 43 which, in turn, impart similar back and forth motion to the sets of rods 14 and 15 through the medium of the connections between the sets of rods and the rock shafts afforded by the arms 44 and 45, the arms 21 and 25, the disc members 29 and 36 and the longitudinally extending tie rods of the arcuate members 16 and 17.

With the cam 58 in the position shown in the drawings the rods of the set 14 are approaching the end of their right-hand stroke and the rods of the set 15 are approaching the end of their left-hand stroke. As the cam 58 continues to rotate the set of rods 14 finally reaches the end of its right-hand stroke and then starts on its left-hand stroke while the set of rods 15 finally reaches the end of its left-hand stroke and then starts on its right-hand stroke.

In this connection it is pointed out that the cams 53 and 58 are so relatively configured and positioned that at all times the rods of at least one set are in outer position and moving to the right, thus preventing any interruption in the laying up of the thread in helical form.

Figure 3:
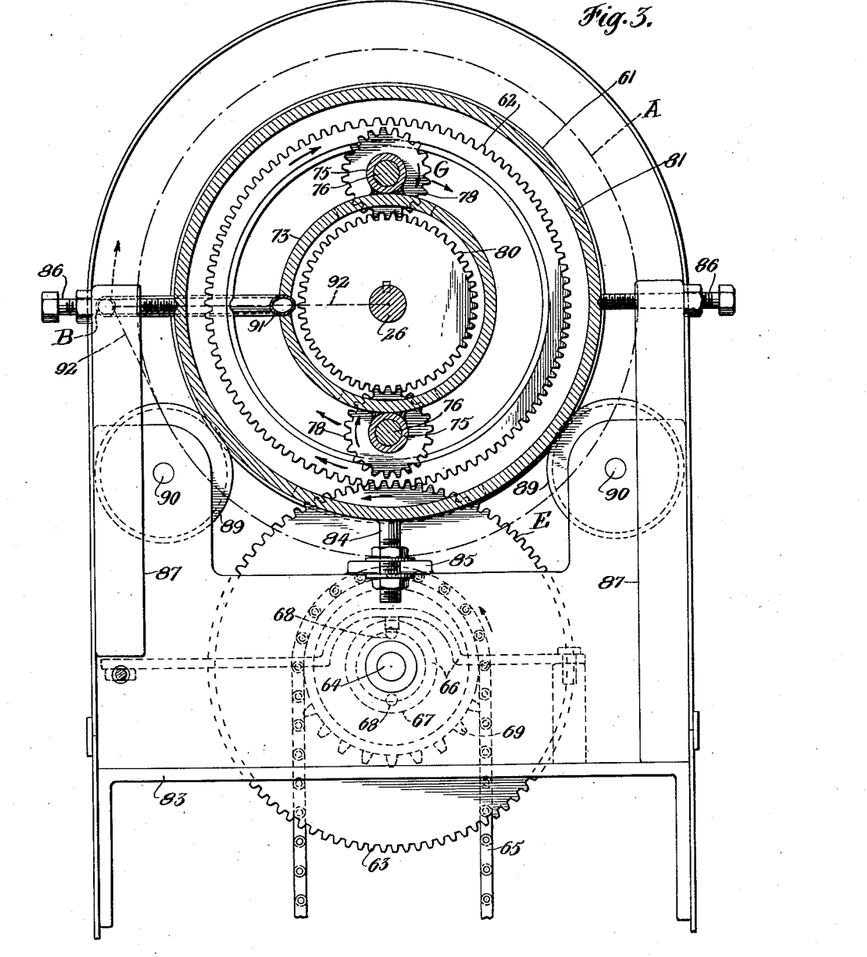
Figure 3 is a cross-section taken substantially on the line 3—3 of Figure 2.
Figure 10:
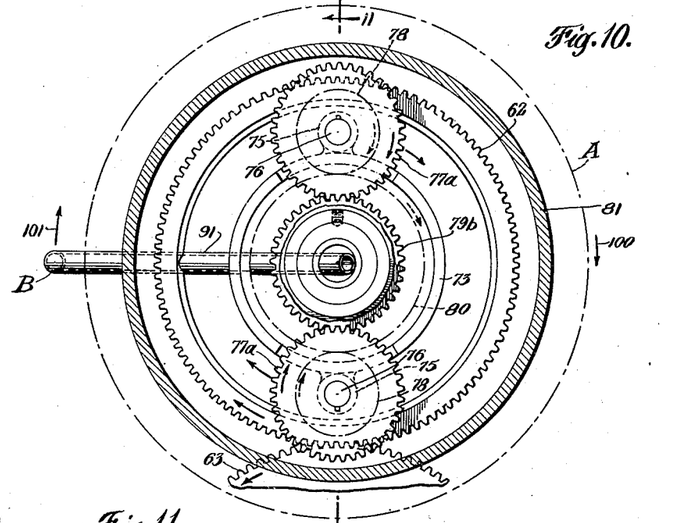
Figure 10 is a fragmentary cross-sectional view similar to Figure 3 taken substantially on the line 10—10 of Figure 11 and illustrating a modification in which gears of different ratios are employed.
Figures 11, 12, 13:
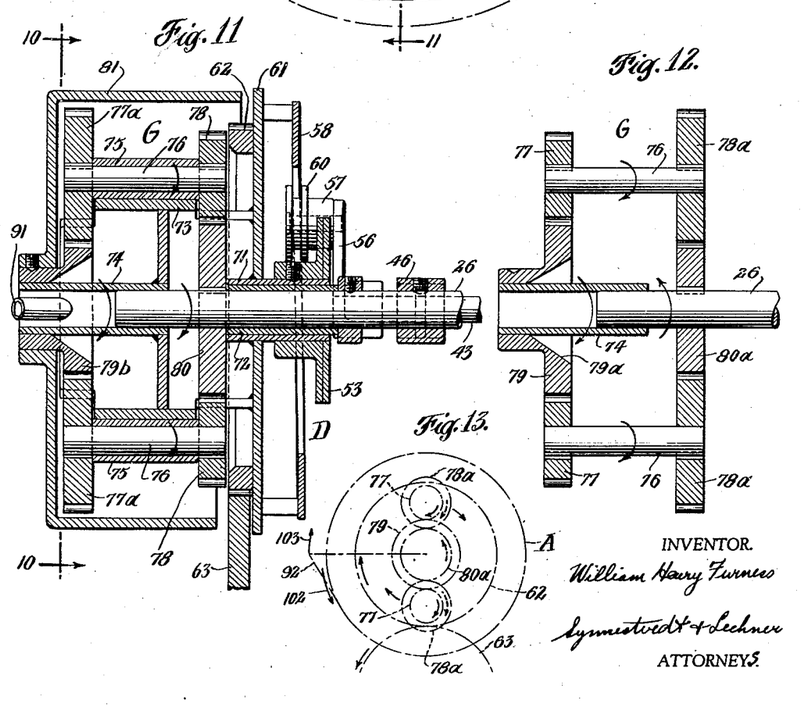
Figure 11 is a fragmentary cross-section taken substantially on the line 11—11 of Figure 10.
Figure 12 illustrates another modified arrangement of gears.
Figure 13 is a diagrammatic face view of the gear arrangement illustrated in Figure 12.

Referring now to Figures 10 and 11 I have shown a modified form of the gear means G in which a smaller gear 79b, and larger gears 77a have been substituted for the gears 79 and 77, respectively, of the form shown in Figures 2 and 3, the gears 78, 80, 62 and 63 remaining of the same size. With this modification, while the whorl B rotates in the same direction and at the same speed as in the first form of my invention, the cylinder A is not held against rotation but rotates in the same direction as the whorl B, as indicated by the arrows 100 and 101 in Figure 10. This is due to the fact that the planetary gears 77a and the gear 79b are of the same diameter while the planetary gears 78 are of smaller diameter than the gears 77a and mesh with a gear 80 of larger diameter than its coaxial gear 79b. Thus, when the planetary gears are rotated bodily through one revolution around the axis of the coaxial gears, the planetary gears 77a and 78 have made one revolution on their axes. However, since the gears 78 are of smaller diameter than the gear 80, the gears 78, in addition to being in rotative mesh with the gear 80, will also carry it with them in their bodily rotation, thus causing it and the cylinder to rotate in the direction indicated by the arrow 100 in Figure 10.

In the modification illustrated in Figures 12 and 13 the planetary gears 77 and the fixed gear 79 are the same as in the form shown in Figures 2 and 3, but planetary gears 78a and a central gear 80a, all of the same diameter, have been substituted for the gears 78 and 80 of Figures 2 and 3. With this modification, while the whorl B rotates in the same direction and at the same speed as in the first form of my invention, the cylinder A is not held against rotation but rotates in a direction opposite to the direction of rotation of the whorl, as indicated by the arrows 102 and 103 in Figure 13. This is due to the fact that the planetary gears 78a and the gear 80a are of the same diameter while the planetary gears 77 are of smaller diameter than the gears 78a and mesh with a fixed gear 79 of larger diameter than its coaxial gear 80a. Thus, when the planetary gears are rotated bodily through one revolution around the axis of the coaxial gears, the planetary gears 77 and 78a have made more than one revolution on their axes. However, since the gears 78a are of the same diameter as the gear 80a, the gears 78a cause the gear 80a to rotate in a direction opposite to the direction of their bodily rotation, as indicated by the arrows in Figure 13.

In connection with the modifications illustrated in Figures 10 and 13 it is pointed out that the gears may be readily changed and that gears of other ratios than those shown may be employed if desired.

Figure 1:
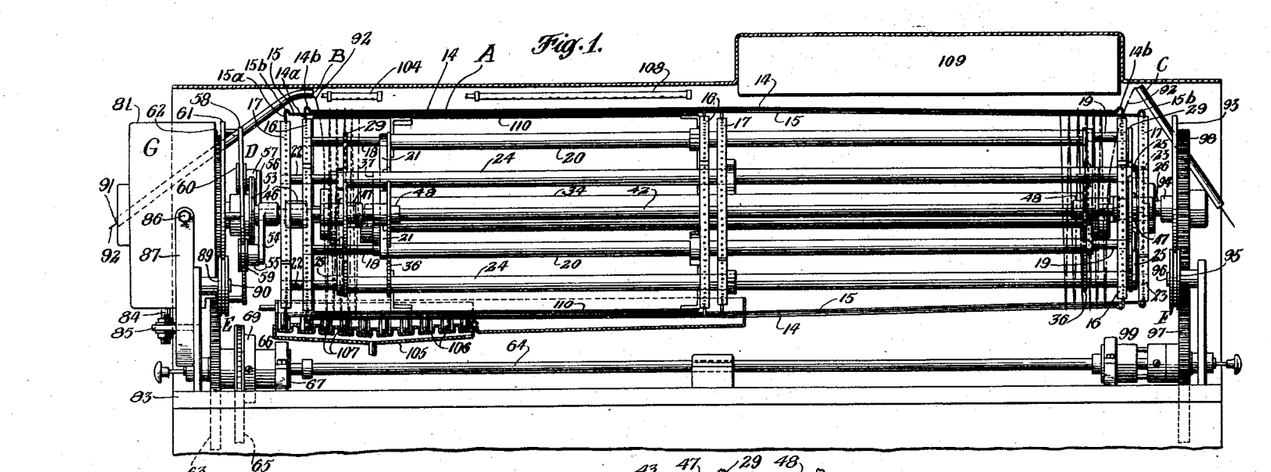
Figure 1 is a fragmentary sectional elevational view of apparatus constructed in accordance with a preferred form of my invention.

Referring now to Figure 1 and assuming that the thread being laid onto the cylinder is in the form of a bundle of filaments led to the cylinder preferably after having been subjected to a water wash, for example, as shown in my copending application Serial No. 332,693, the bundle of filaments or thread is first subjected to a sulphuric acid wash solution supplied by a perforated pipe 104. The acid wash solution runs down over the cage and is collected in a pan 105 having a series of troughs 106 in which nozzled pipes 107 are located for the purpose of blowing the acid wash liquor up against the bottom of the cage to effectively subject the filaments to the acid wash in the manner disclosed in said copending application.

As the filaments advance along the cylinder they are subjected to a water wash supplied by means of a perforated pipe 108. Next the filaments are subjected to a drying operation as by means of a heater 109 of any suitable form, and then finally they are removed from the cylinder by means of the take-off whorl C.

In order to prevent the liquids from dripping over the interior parts of the cylinder I have provided an inner cylindrical casing 110 which is supported adjacent one end thereof from the left-hand disc member 36 and at its other end from the intermediate arcuate members 16 as by means of brackets 111. This cylindrical casing is of such diameter as to be closely adjacent the longitudinal rods of the cylinder which are in their innermost positions. Thus, the threads are better subjected to the acid and water washes.

With reference to the forms of my invention in which the cylinder is rotated it is pointed out that this exposes the filaments all the way around the cylinder to the washes at the points where the washes are applied, thus subjecting them to more effective washing action.

I claim:

1. Apparatus for laying up thread, comprising a cage-like cylinder; a whorl for laying thread on said cylinder adjacent one end thereof; said cylinder having thread supporting surfaces movable in a direction of the length of said cylinder to advance the thread therealong from said receiving end to the other end in the form of a continuously advancing helix; a whorl for taking thread off said cylinder adjacent said other end; means for rotating said whorls in one to one ratio; means for supporting said cylinder; and gear means for controlling rotative movement of said cylinder.

2. Apparatus for laying up thread, comprising a cage-like cylinder; a whorl for laying thread on said cylinder adjacent one end thereof; said cylinder having thread supporting surfaces movable in a direction of the length of said cylinder to advance the thread therealong from said receiving end to the other end in the form of a continuously advancing helix; a whorl for taking thread off said cylinder adjacent said other end; means for rotating said whorls in one to one ratio; means for supporting said cylinder; and gear means for controlling rotative movement of said cylinder, comprising a gear fixedly connected to said cylinder in coaxial relation thereto, a fixed non-rotatable gear mounted in spaced coaxial relation to said first mentioned gear, planetary gears meshing with said spaced coaxial gears, and means rotatable at the same speed and in the same direction as said whorls for rotatably supporting said planetary gears.

3. Apparatus for laying up thread, comprising a cage-like cylinder; a whorl for laying thread on said cylinder adjacent one end thereof; said cylinder having thread supporting surfaces movable in a direction of the length of said cylinder to advance the thread therealong from said receiving end to the other end in the form of a continuously advancing helix; a whorl for taking thread off said cylinder adjacent said other end; means for rotating said whorls in one to one ratio; means for supporting said cylinder; and gear means for controlling rotative movement of said cylinder, comprising a gear fixedly connected to said cylinder in coaxial relation thereto, a fixed non-rotatable gear mounted in spaced coaxial relation to said first mentioned gear, said spaced gears being of the same diameter, planetary gears meshing with said spaced gears, and means rotatable at the same speed and in the same direction as said whorls, for rotatably supporting said planetary gears.

4. Apparatus for laying up thread, comprising a cage-like cylinder; a whorl for laying thread on said cylinder adjacent one end thereof; said cylinder having thread supporting surfaces movable in a direction of the length of said cylinder to advance the thread therealong from said receiving end to the other end in the form of a continuously advancing helix; a whorl for taking thread off said cylinder adjacent said other end; means for rotating said whorls in one to one ratio; means for supporting said cylinder; and gear means for controlling rotative movement of said cylinder, comprising a gear fixedly connected to said cylinder in coaxial relation thereto, a fixed non-rotatable gear mounted in spaced coaxial relation to said first mentioned gear, said spaced gears being of different diameters, planetary gears meshing with said spaced gears, and means rotatable at the same speed and in the same direction as said whorls for rotatably supporting said planetary gears.

5. Apparatus for laying up thread comprising a cage-like cylinder having thread supporting surfaces movable to advance thread laid onto said cylinder at one end therealong to the other end in the form of a continuously advancing helix; a whorl for laying up thread on said cylinder at the receiving end; a whorl for taking thread off said cylinder at the other end; cam means for imparting movement to said thread supporting surface to advance the thread as aforesaid; and gear means for controlling rotative movement of said cylinder; said cylinder, said whorls, said cam means, and said gear means being mounted in coaxial relation.

6. Apparatus for laying up thread comprising a cage-like cylinder having thread supporting surfaces movable to advance thread laid onto said cylinder at one end therealong to the other end in the form of a continuously advancing helix; a whorl for laying up thread on said cylinder at the receiving end; a whorl for taking thread off said cylinder at the other end; cam means for imparting movement to said thread supporting surface to advance the thread as aforesaid; means for rotating said whorls and said cam means at the same speed; and gear means for controlling rotative movement of said cylinder.

7. Apparatus for laying up thread, comprising a cage-like cylinder; a whorl for laying thread on said cylinder adjacent one end thereof; said cylinder having thread supporting surfaces movable in a direction of the length of said cylinder to advance the thread therealong from said receiving end to the other end in the form of a continuously advancing helix; a whorl for taking thread off said cylinder adjacent said other end; means for rotating said whorls in one to one ratio; means for supporting said cylinder; and means for preventing rotative movement of said cylinder comprising a fixed support, a gear fixedly secured to said support in coaxial relation to said cylinder, a gear in spaced coaxial relation to said first gear and fixedly connected to said cylinder, said spaced coaxial gears being of the same diameter, planetary gears meshing with said spaced coaxial gears, and a support for said planetary gears rotatable at the same speed and in the same direction as said whorls.

8. Apparatus for laying up thread, comprising a cage-like cylinder; a whorl for laying thread on said cylinder adjacent one end thereof; said cylinder having thread supporting surfaces movable in a direction of the length of said cylinder to advance the thread therealong from said receiving end to the other end in the form of a continuously advancing helix; a whorl for taking thread off said cylinder adjacent said other end; means for rotating said whorls in one to one ratio; means for supporting said cylinder; and means for rotating said cylinder comprising a fixed support, a gear fixedly secured to said support in coaxial relation to said cylinder, a gear in spaced coaxial relation to said first gear and fixedly connected to said cylinder, said spaced coaxial gears being of different diameters, planetary gears meshing with said spaced coaxial gears, and a support for said planetary gears rotatable at the same speed and in the same direction as said whorls.

9. Apparatus for laying up thread, comprising a rotating cage-like thread carrying cylinder composed of two sets of concentrically arranged longitudinally extending rods, the rods of one set being interspersed with the rods of the other set; means for imparting back and forth longitudinal movement and in and out movement to the rods of one set; means for imparting back and forth longitudinal movement and in and out movement to the rods of the other set independently of said first set including rotating cam means mounted coaxially with said cylinder; whorl means for laying thread onto said cylinder adjacent one end thereof; means common to said cam and whorl means for rotating them; gear means associated with said whorl and cam means, for controlling rotation of said cylinder without interfering with the rotation of said whorl means; whorl means for taking thread off said cylinder adjacent the end opposite the laying up end thereof at the same rate it is laid onto the cylinder; and means for driving said take-off whorl means in one to one ratio with the laying up whorl means.

10. Apparatus for laying up thread comprising a central shaft, a cage-like cylinder mounted in surrounding and fixed relation to said shaft, said cylinder having a plurality of circularly arranged longitudinally extending thread carrying rods, means for mounting said rods for longitudinal back and forth and for in and out movement, said mounting means being supported by said central shaft, actuating means for imparting said back and forth and in and out movement to said rods to advance thread along the cylinder in the form of a continuously advancing helix, cams for operating said actuating means, said cams being rotatably mounted on said shaft, cylindrical members rotatably mounted on said central shaft adjacent the ends of said cylinder; fixed rollers peripherally supporting cylindrical members, a gear secured on said central shaft, a fixed support, a gear fixed to said support and mounted in longitudinally spaced coaxial relation to said first mentioned gear, longitudinally spaced planetary gears meshing with said spaced coaxial gears, a mounting for said planetary gears rotatably carried by said central shaft, a thread laying up whorl mounted for rotation around said central shaft, a thread taking off whorl mounted for rotation around said central shaft, and means for imparting rotative movement to said whorls, said cams, and said planetary gear support at the same speed and in the same direction.

11. Apparatus for laying up thread, comprising a cage-like cylinder; a whorl for laying thread on said cylinder adjacent one end thereof; said cylinder having thread supporting surfaces movable in a direction of the length of said cylinder to advance the thread therealong from said receiving end to the other end in the form of a continuously advancing helix; a whorl for taking thread off said cylinder adjacent said other end; means for rotating said whorls in one to one ratio; means for supporting said cylinder; and means for preventing rotative movement of said cylinder comprising a fixed support, a gear fixedly secured to said support in coaxial relation to said cylinder, a gear in spaced coaxial relation to said first gear and fixedly connected to said cylinder, said spaced coaxial gears being of the same diameter, planetary gears meshing with said spaced coaxial gears, and a support for said planetary gears rotatable at the same speed and in the same direction as said whorls, the gears of said gear unit being removable to enable the substitution of other gears of diameters to effect rotation of said cylinder.

12. Apparatus for laying up thread, comprising a cage-like cylinder; a whorl for laying thread on said cylinder adjacent one end thereof; said cylinder having thread supporting surfaces movable in a direction of the length of said cylinder to advance the thread therealong from said receiving end to the other end in the form of a continuously advancing helix; a whorl for taking thread off said cylinder adjacent said other end; means for rotating said whorls in one to one ratio; means for supporting said cylinder; and gear means for controlling rotative movement of said cylinder, comprising a gear fixedly connected to said cylinder in coaxial relation thereto, a fixed non-rotatable gear mounted in spaced coaxial relation to said first mentioned gear, said spaced gears being of different diameters, planetary gears meshing with said spaced gears, and means rotatable at the same speed and in the same direction as said whorls for rotatably supporting said planetary gears, said gears being of such ratios that the cylinder is caused to rotate in the same direction as the whorls but at a different speed.

13. Apparatus for laying up thread, comprising a cage-like cylinder; a whorl for laying thread on said cylinder adjacent one end thereof; said cylinder having thread supporting surfaces movable in a direction of the length of said cylinder to advance the thread therealong from said receiving end to the other end in the form of a continuously advancing helix; a whorl for taking thread off said cylinder adjacent said other end; means for rotating said whorls in one to one ratio; means for supporting said cylinder; and gear means for controlling rotative movement of said cylinder, comprising a gear fixedly connected to said cylinder in coaxial relation thereto, a fixed non-rotatable gear mounted in spaced coaxial relation to said first mentioned gear, said spaced gears being of different diameters, planetary gears meshing with said spaced gears, and means rotatable at the same speed and in the same direction as said whorls for rotatably supporting said planetary gears, said gears being of such ratios that the cylinder is caused to rotate in a direction opposite to the direction of rotation of said whorls.

14. The method of laying up thread on a cage-like cylinder which consists in whirling the thread around the periphery of said cylinder at one end thereof to lay the thread on the cylinder, in moving the thread so laid from said end toward the other end of the cylinder at a rate relative to the rate of laying it on the cylinder to provide a continuously advancing helix of thread on the cylinder, in similarly whirling the thread around the periphery of said cylinder at said other end thereof to remove the thread from the cylinder turn for turn of its being laid thereon, and in rotating said cylinder while thread is being laid on and removed from said cylinder.

15. The method of laying up thread on a cage-like cylinder which consists in whirling the thread around the periphery of said cylinder at one end thereof to lay the thread on the cylinder, in moving the thread so laid from said end toward the other end of the cylinder at a rate relative to the rate of laying it on the cylinder to provide a continuously advancing helix of thread on the cylinder, in similarly whirling the thread around the axis of said cylinder at said other end thereof to remove the thread from the cylinder turn for turn of its being laid thereon, and in rotating said cylinder while it is being laid on and removed from said cylinder in the same direction of rotation as the whorls.

16. The method of laying up thread on a cage-like cylinder which consists in whirling the thread around the periphery of said cylinder at one end thereof to lay the thread on the cylinder, in moving the thread so laid from said end toward the other end of the cylinder at a rate relative to the rate of laying it on the cylinder to provide a continuously advancing helix of thread on the cylinder, in similarly whirling the thread around the axis of said cylinder at said other end thereof to remove the thread from the cylinder turn for turn of its being laid thereon, and in rotating said cylinder while it is being laid on and removed from said cylinder in a direction of rotation opposite to the direction of rotation of the whorls.

WILLIAM H. FURNESS.

CERTIFICATE OF CORRECTION.

Patent No. 2,260,565.  October 28, 1941.

WILLIAM H. FURNESS.

It is hereby certified that error appears in the printed specification of the above numbered patent requiring correction as follows: Page 6, first column, line 16, and second column, line 12, claims 15 and 16 respectively, for the word "axis" read --periphery--; and that the said Letters Patent should be read with this correction therein that the same may conform to the record of the case in the Patent Office.

Signed and sealed this 9th day of December, A. D. 1941.

(Seal) 　　　　　　　　　　　　　　　　Henry Van Arsdale,
　　　　　　　　　　　　　　　　Acting Commissioner of Patents.